United States Patent [19]
Nethery, III

[11] Patent Number: 6,032,863
[45] Date of Patent: Mar. 7, 2000

[54] METHOD AND APPARATUS FOR PRODUCING MACHINE READABLE BAR CODE

[76] Inventor: S. Kee Nethery, III, 1442-A Walnut St. #392, Berkeley, Calif. 94709

[21] Appl. No.: 09/052,158

[22] Filed: Mar. 31, 1998

[51] Int. Cl.[7] .................................................. G06K 7/10
[52] U.S. Cl. .............................. 235/462.07; 235/462.25; 235/375; 235/494
[58] Field of Search .......................... 235/462.07, 462.1, 235/462.12, 462.16, 462.25, 494, 375; 283/70, 74, 81

[56] References Cited

U.S. PATENT DOCUMENTS

| | | | |
|---|---|---|---|
| 3,211,470 | 10/1965 | Wilson | 235/494 |
| 3,654,435 | 4/1972 | Vaccaro | 235/494 |
| 3,744,025 | 7/1973 | Bilgtay | 235/494 |
| 3,959,631 | 5/1976 | Otten | 235/487 |
| 4,130,243 | 12/1978 | Stevens | 235/487 |
| 4,259,569 | 3/1981 | Passer et al. | 235/494 X |
| 4,308,455 | 12/1981 | Bullis et al. | 235/462.01 X |
| 4,728,784 | 3/1988 | Stewart | 235/487 X |
| 4,824,266 | 4/1989 | Fujii et al. | 395/110 |
| 5,203,591 | 4/1993 | Treat | 235/494 |
| 5,233,167 | 8/1993 | Markman et al. | 235/375 |
| 5,298,731 | 3/1994 | Ett | 235/494 |
| 5,347,114 | 9/1994 | Tanaka | 235/494 |
| 5,361,871 | 11/1994 | Gupta et al. | 235/383 X |
| 5,869,819 | 2/1999 | Knowles et al. | 235/375 |

*Primary Examiner*—Michael G Lee
*Attorney, Agent, or Firm*—Donald W. Marks

[57] ABSTRACT

A machine readable bar code is formed from a bar code datum by generating a first bar code image section encoding the bar code datum by a horizontal arrangement of first vertical bar sections separated by first vertical space sections wherein the first vertical bar sections have first widths selected to produce a first printed bar code section of correct ratios of space width to bar width for a first type of printer; and generating a second bar code image section encoding the bar code datum by a horizontal arrangement of second vertical bar sections separated by second vertical space sections wherein the second vertical bar sections have second widths larger than the first widths and selected to produce a second printed bar code image section of correct ratio of space width to bar width for a second type of printer. A document containing a print of this dual bar code is then readable by a conventional bar code scanner irrespective of the type of printer used to print the document.

6 Claims, 5 Drawing Sheets

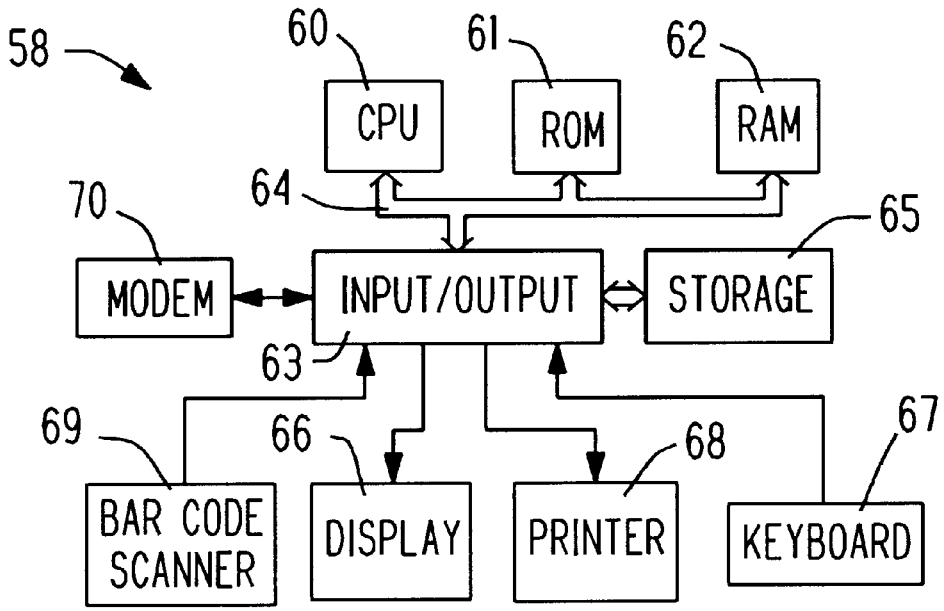
FIG. 13
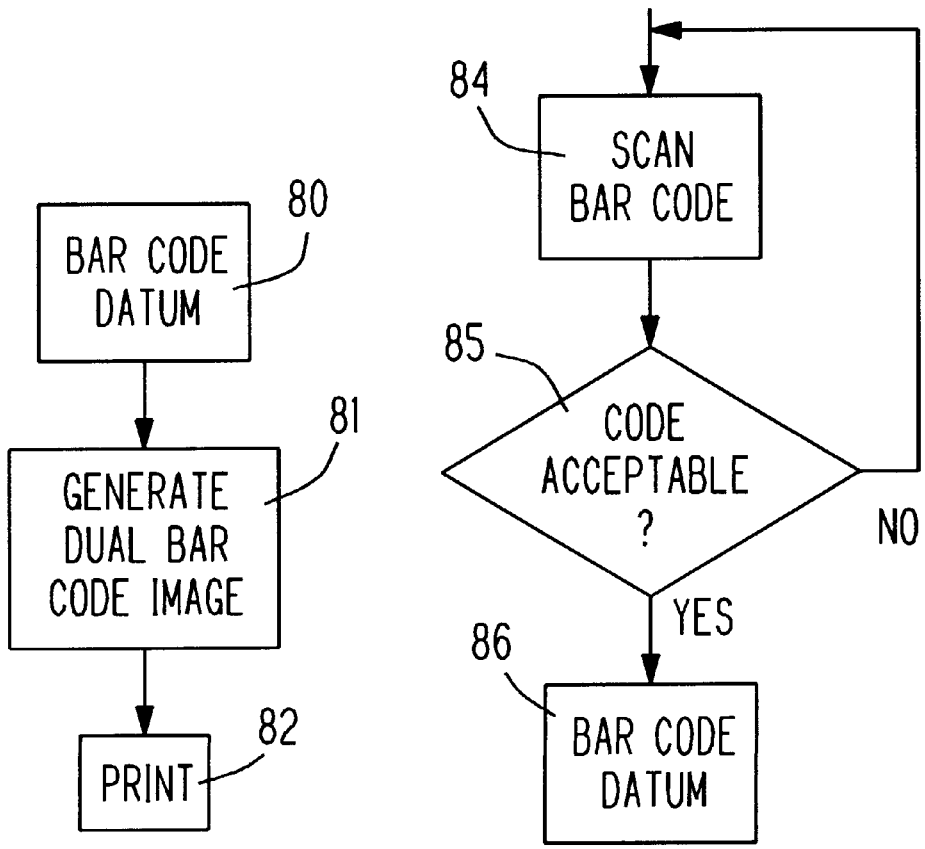
FIG. 14
FIG. 15

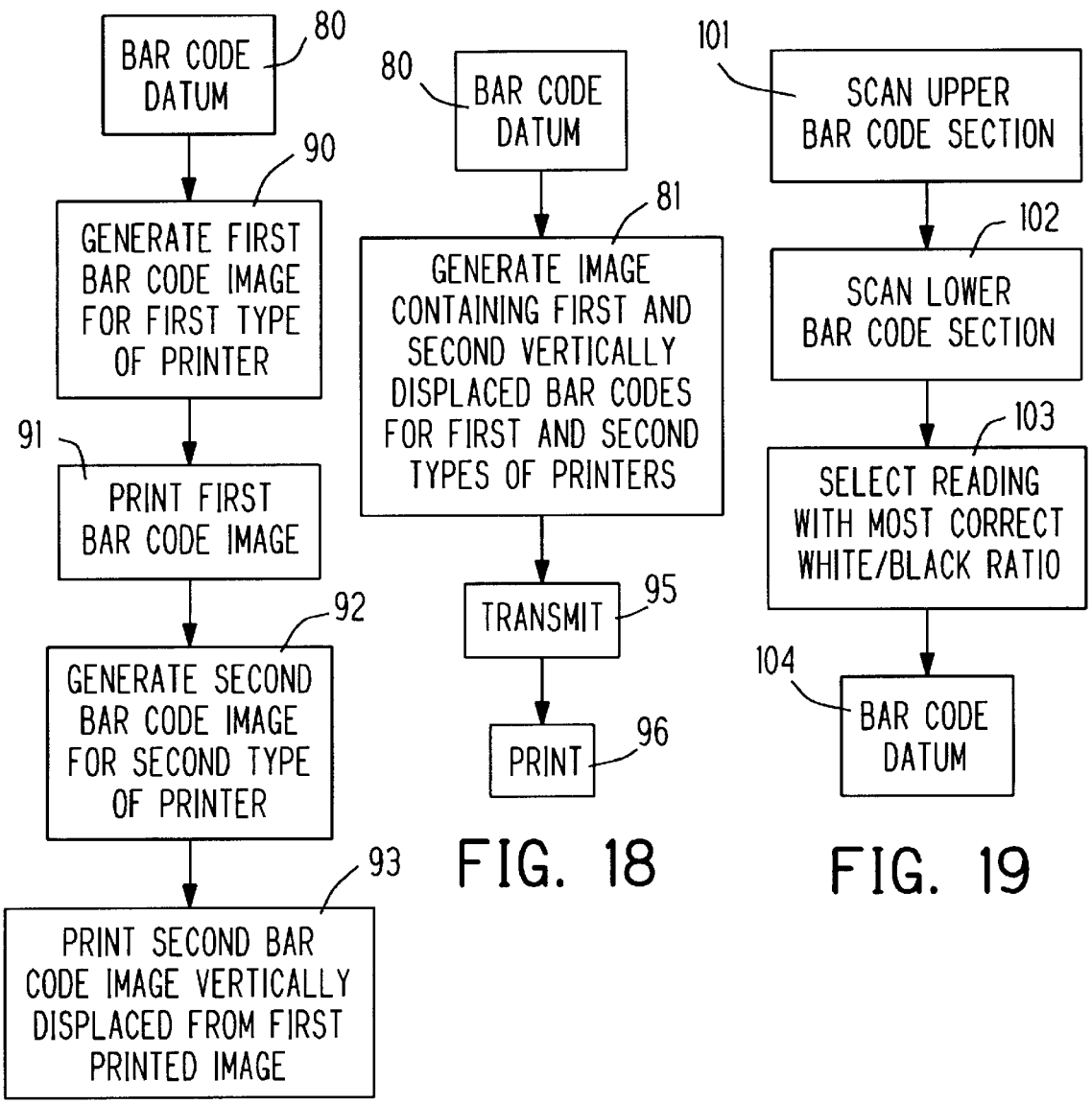

METHOD AND APPARATUS FOR PRODUCING MACHINE READABLE BAR CODE

TECHNICAL FIELD

The present invention relates to methods, apparatus and software for producing machine readable bar codes formed by a horizontal arrangement of vertical bars and spaces wherein the coding is determined by the relative horizontal widths of adjacent bars and spaces.

BACKGROUND ART

In FIG. 1 there is illustrated generally at 30 a hypothetical example of a prior art machine readable bar code employing a horizontal arrangement of vertical bars 31 of variable width separated by variable width spaces 32. Such bar codes are widely employed on labels for products and files and on various documents and the like where the entry of datum such as a number or other information into a computer can be expedited and made error free by machine reading of the bar code. These bar codes are often produced on the labels, documents, etc. by using a computer to generate a bit or dot image of the code and transmitting this bit image along with pertinent control and other information to a printer which then prints the bar code on the label or document with possible other information. Many computer programs exist for generating such bar code bit images and operating printers to print the bar code.

One common method of reading these machine readable bar codes is to scan an infrared light beam horizontally across the bar code and then analyze a signal produced in a light sensor sensing reflection of the light beam. An alternate method is to project an image of the bar code onto a linear array of light sensors and to analyze the signals produced by the sensor array. In any of the methods of reading such bar codes, the widths of the bars relative to the spacings between bars is critical since these relative widths encode the datum represented by the bar code.

However there exists a problem in the prior art of producing these critical bar widths on different types of printers since different types of printers can produce different widths of bars. This problem is illustrated in FIGS. 2, 3, 4 and 5 in attempts to produce a bar code including a first bar 31 which is equal in width to the width of the following space 32. Each individual bar is formed by contiguous or overlapping rows and columns of bits. In one type of printer exemplified by laser printers and various other types of printers, the printer produces generally square contiguous bits such as illustrated by bits 35 in FIGS. 2 and 5. In another type of printer exemplified by ink jet printers and various other types of printers, the printer produces overlapping round bits such as illustrated by the bits 36 in FIGS. 3 and 4. From FIG. 2 it is seen that three columns of the contiguous dots 35 produce the correct ratio of white width WW2 to black width WB2 of one, i.e., WW2/WB2=1. However from FIG. 3 it is seen that three columns of 50% overlapping dots 36 intrude into the white space 32 to produce an incorrect ratio of white width WW3 to black width WB3 of one-half, i.e., WW3/WB3=½. From FIG. 4 it is seen that two columns of the 50% overlapping dots 36 produce the correct ratio of white width WW4 to black width WB4 of one, i.e., WW4/WB4=1. However from FIG. 5 it is seen that two columns of the contiguous dots 35 produce an incorrect ratio of white width WW5 to black width WB5 of two, i.e., WW5/WB5=2.

The prior art solution to this problem is to provide different bar width generators in the bar code image producing programs and to require the entry of the type of printer into the bar code producing program to select the appropriate bar width generator to print the correct bar widths. For the example of FIGS. 2–5, the prior art responds to the selection of the first type of printer to print one module width bars with three dot columns and one module width spaces with three dot wide spaces, and responds to the selection of the second type of printer to print one module width bars with two dot columns and one module width spaces with four dot wide spaces.

SUMMARY OF INVENTION

An object of the present invention is to provide a method, apparatus and computer program for generating a printable bar code image readable by conventional bar code scanners irrespective of the printer used to print the bar code.

In accordance with this and other objects, the present invention is summarized in a method, an apparatus or a computer program generating a first bar code image section encoding the bar code datum by a horizontal arrangement of first vertical bar sections separated by first vertical space sections wherein the first vertical bar sections have first widths selected to produce a first printed bar code section of correct ratios of space width to bar width for a first type of printer; and generating a second bar code image section encoding the bar code datum by a horizontal arrangement of second vertical bar sections separated by second vertical space sections wherein the second vertical bar sections have second widths less than the first widths and selected to produce a second printed bar code image section of correct ratio of space width to bar width for a second type of printer. These first and second bar code sections can be printed by either the first or second type of printer in vertically displaced positions on a label or document. A conventional bar code reader or scanner can be used to read the bar code in the first or second printed bar code section depending upon which section has the correct bar width to space width for a conventional bar code.

One advantage of the present invention is the elimination of the need for programs to identify the type of printer to enable printing a correct bar code.

Another advantage of the present invention is the enabling of the transfer of bar code bit images over a network including the internet so that the recipient of the bar code bit image can print a machine readable bar code on a document.

Additional objects, advantages and features of the invention will be apparent from the following description of the preferred embodiments taken together with the accompanying drawings.

BRIEF DESCRIPTION OF DRAWINGS

FIG. 13 is a block diagram of a computer system for forming the bar code of FIG. 7 in accordance with the present invention.

FIG. 14 is a program flow diagram illustrating a procedure employed software in the computer system of FIG. 13 to form and print the bar code.

FIG. 15 is a program flow diagram illustrating a procedure in employed in software in the computer system of FIG. 13 to read the bar code of FIG. 7.

FIG. 17 is a program flow diagram illustrating a second variation of the bar code forming and printing procedure and which can be employed in the computer systems of FIGS. 13 and 16.

FIG. 18 is a program flow diagram illustrating a third variation of the bar code forming and printing procedure and which can be employed software in the computer system of FIG. 16.

FIG. 19 is a program flow diagram illustrating a second variation of the bar code reading procedure and which can be employed in the computer systems of FIGS. 13 and 16.

DESCRIPTION OF THE PREFERRED EMBODIMENTS

Figure 1:
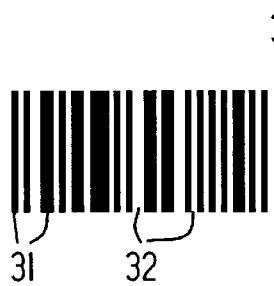
FIG. 1 is a plan view of a hypothetical bar code illustrating features of conventional bar codes in wide use.
Figure 2:
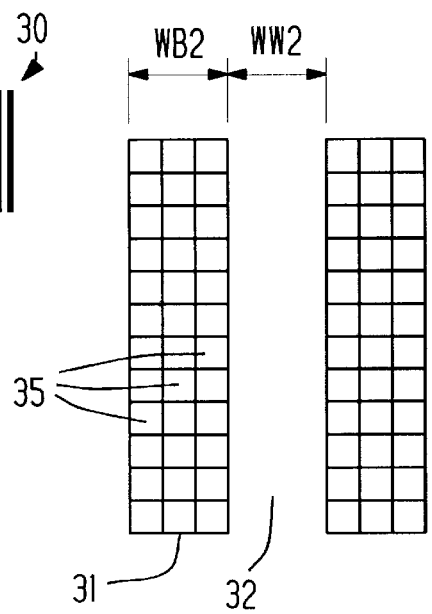
FIG. 2 is a diagrammatic view of two bars and an intervening space in the conventional bar code of FIG. 1 as printed on a first type of printer.
Figure 3:
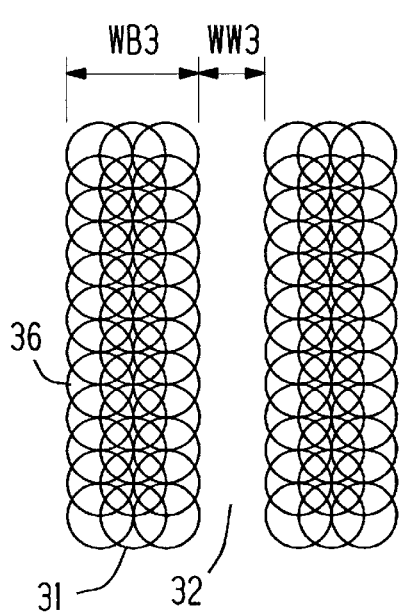
FIG. 3 is a diagrammatic view of two bars and an intervening space in the conventional bar code similar to FIG. 2 but as printed on a second type of printer.
Figure 4:
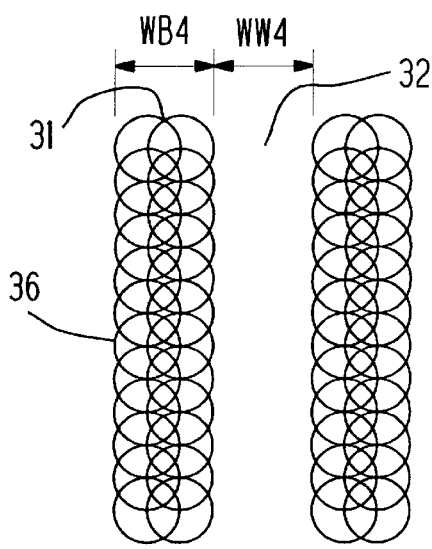
FIG. 4 is a diagrammatic view of two bars and an intervening space in the conventional bar code similar to FIG. 3 but with the bars having a narrower width printed by the second type of printer.
Figure 5:
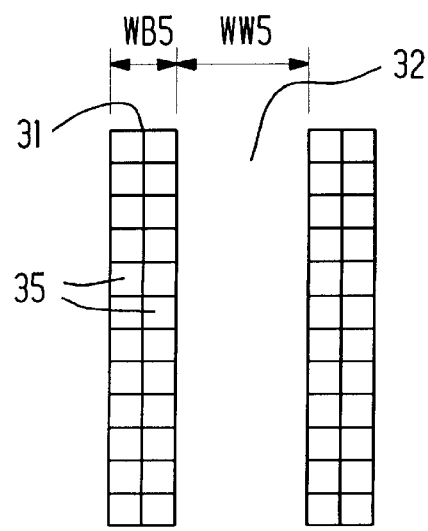
FIG. 5 is a diagrammatic view of two bars and an intervening space in the conventional bar code similar to FIG. 2 but with the bars having a narrower width printed by the first type of printer.
Figure 6:
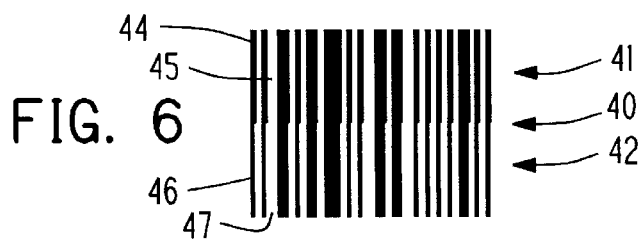
FIG. 6 is a plan view of a hypothetical bar code formed by the method, apparatus or software of the present invention.

As shown in FIG. 6, a bar code indicated generally at 40 includes vertically displaced bar code sections 41 and 42 each encoding the same bar code datum but wherein bars of one of the sections all have narrower widths than the the bars of the other section. For example, the bar widths of the upper bar code section 41 are designed for a first type of printer to print bars with intervening spaces correctly encoding the bar code datum, and the bar widths of the lower bar code section 42 are designed for a second type of printer to print bars with intervening spaces correctly encoding the bar code datum. Depending upon whether the bar code 40 was printed on the first type or second type of printer, an operator uses a conventional bar code scanner to read either the upper bar code section 41 or the lower bar code section 42.

The example 40 in FIG. 6, is not an actual bar code readable by a conventional scanner but rather is simply an illustration of upper and lower bar code sections encoding the same bar code datum in a manner similar to widely used conventional bar codes. The upper bar code section 41 includes a horizontal arrangement of upper bar sections 44 separated by upper space sections 45 encoding the bar code datum. The vertically displaced lower bar code section 42 is a similar horizontal arrangement of lower bar sections 46 separated by lower space sections 47 encoding the same bar code datum but employing different width bar sections.

Figure 7:
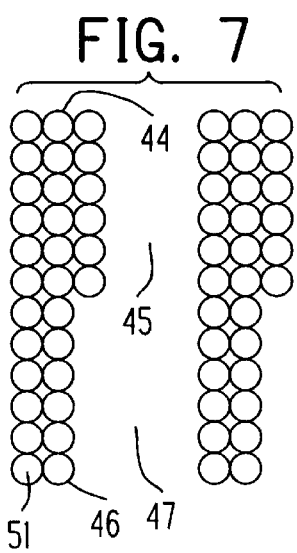
FIG. 7 is a diagrammatic view of image bit or dot construction used to form two bars and an intervening space in the bar code of FIG. 6.
Figure 8:
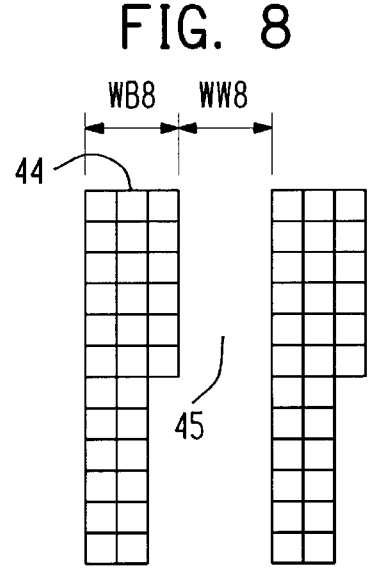
FIG. 8 is a diagrammatic view of the printout of the dot image of FIG. 7 by the first type of printer.
Figure 9:
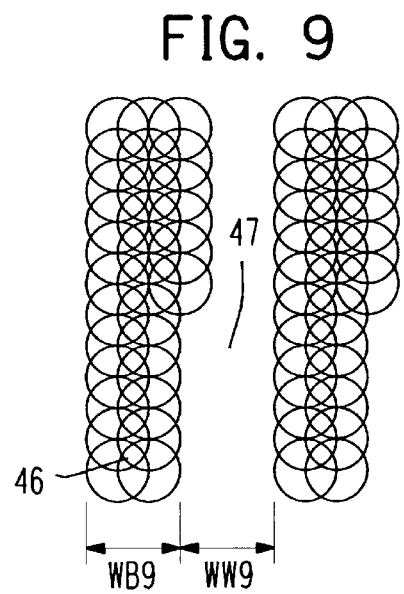
FIG. 9 is a diagrammatic view of the printout of the dot image of FIG. 7 by the second type of printer.

The bars and intervening spaces forming the bar code sections 41 and 42 are initially formed by generating bit images of the bars and intervening spaces. The bit images for each bar and adjacent space in each of the sections 41 and 42 may be constructed by conventional algorithms or by retrieving stored bit images of bars or bar segments. In the example of FIG. 7, the bar section 44 of the upper bar code section is formed with three adjacent columns of bits or dots 51 while the bar section 46 of the lower bar code section is formed with only two adjacent columns of bits or dots 51. The upper space 45 is equivalent in width to three bit columns while the lower space 47 is equivalent in width to four bit columns. When these upper and lower bar code sections are printed by a first type of printer as contiguous square dots as illustrated in FIG. 8, the upper bar code section has the correct ratio of white width WW8 to black width WB5, i.e., WW8/WB8=1 for the illustrated first upper bar section 44 and adjacent space 45. When these upper and lower bar code sections are printed by a second type of printer as 50% overlapping round dots as illustrated in FIG. 9, the lower bar code section has the correct ratio of white width WW9 to black width WB9, i.e., WW9/WB9=1 for the illustrated first lower bar section 46 and adjacent space 47.

Figure 10:
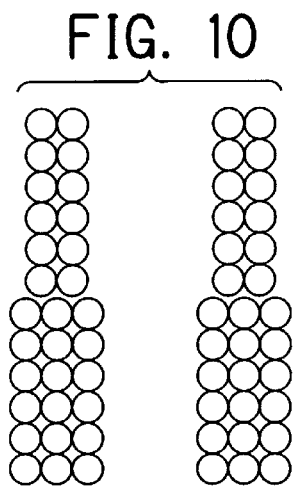
FIG. 10 is a diagrammatic view similar to FIG. 7 but of a second variation of the image bit or dot construction used to form the two bars and intervening space.
Figure 11:
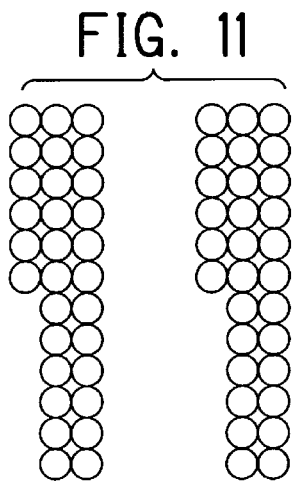
FIG. 11 is a diagrammatic view similar to FIG. 7 but of a third variation of the image bit or dot construction used to form the two bars and intervening space.
Figure 12:
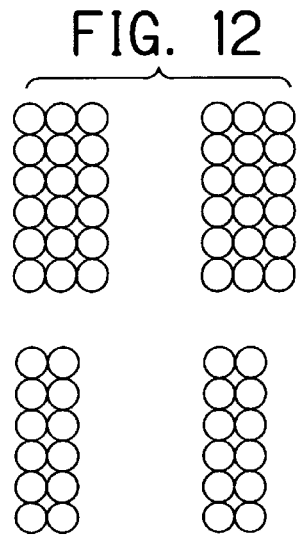
FIG. 12 is a diagrammatic view similar to FIG. 7 but of a fourth variation of the image bit or dot construction used to form the two bars and intervening space.

It is noted that the illustrated widths of three and two bit columns separated by three and four bit wide spaces are for illustration purposes and that actual bars and spaces can be formed with more or less bit columns. The bar section widths and the widths of adjacent spaces vary throughout the bar code to produce the appropriate white width to black width ratios encoding the bar code datum; for example, bars can be one module (i.e., two and three bits) wide, two modules (i.e., five and six bits) wide or three modules (i.e., eight and nine bits) wide and spaces can be one module (i.e., three and four bits) wide, two modules (i.e., six and seven bits) wide and three modules (i.e., nine and ten bits) wide. The placement of the upper and lower bar code sections relative to each other can vary so long as they are vertically displaced and sufficiently adjacent to produce the impression of being a single bar code. In the bit image of FIG. 7, the left edges of the upper and lower bar sections are aligned. In the bit image of FIG. 10 the upper bar sections are centered relative to the lower bar sections. In FIG. 11, the right edges of the upper and lower bar sections are aligned. Also, the upper bar sections can be the narrower bar sections as shown in FIG. 10. As shown in FIG. 12, the upper and lower bar sections do not have to be touching and can be separated.

A computer system for forming and printing the bar code in accordance with the invention is illustrated generally at 58 in FIG. 13. This computer system includes a central processing unit (CPU) 60, a read only memory (ROM) 61, a random access memory (RAM) 62, and input/output 63 all interconnected by a bus 64. The input/output 63 is one or more interface circuits or units for joining the bus 64 to a storage unit 65, a display 66, a keyboard 67, a printer 68, a bar code scanner 69 and a modem 70. The storage 65 is one or more mass memory units such as a hard disk, floppy disk, CD ROM, etc., containing machine readable medium.

The computer system is controlled by a program stored on the machine readable medium of the storage 65 and which can be loaded into RAM 62 for execution by the CPU 60. This program includes the procedure of FIG. 14 which begins at step 80 with a bar code datum. This bar code datum is a multidigit number or alphanumeric string which is entered by an operator via the keyboard 67, received from an external computer or device via the modem 70, or generated internally by the program. In step 81, a dual bar code image having upper and lower bar code image sections with attributes similar to that described above in connection with FIGS. 6–12 is generated from the bar code datum. This dual bar code image along with other data is then subsequently sent to the printer 68 in step 82 to print a label or document containing the dual bar code. The upper and lower bar code sections each encode the bar code datum but the bars in one of the upper and lower bar code sections have widths less than the widths of the other bar code section. One of the printed upper and lower bar code sections has the correct ratio of white width to dark width to enable reading the bar code datum by a conventional bar code scanner.

The computer system of FIG. 13 can also include the procedure of FIG. 15 wherein a bar code is scanned in step 84. A determination is made in step 85 whether the scanned information is acceptable. If true the scanned information is accepted as the bar code datum in step 86, otherwise the scan of step 84 is repeated until acceptable information is received. Initially the scanner scans either the upper or lower section of the dual bar code. If the scanner 69 does not read an acceptable bar code, the scanner then is operated to scan the other section of the dual bar code.

A modified procedure, shown in FIG. 17, for generating and printing the dual bar code generates a first bar code image of the bar code datum for a first type of printer in step 90 and prints this first image in step 91. A second bar image for a second type of printer is generated in step 92 and this second bar code image is then sent to the printer in step 93 along with position control information to print the second bar code image at a position vertically displaced from the first printed image. The result is a printed dual bar code image similar to that produced by the procedure of FIG. 14.

Figure 16:
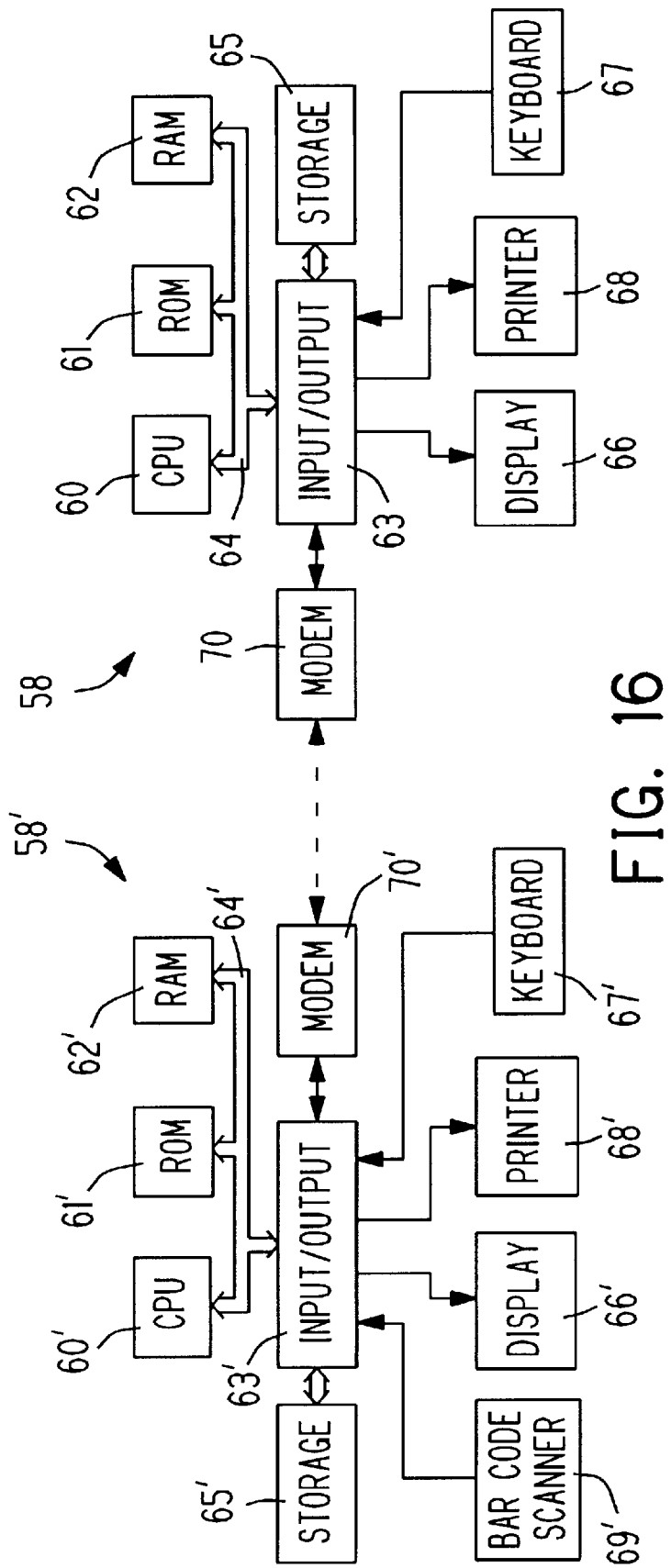
FIG. 16 is a block diagram of a second computer system for forming the bar code of FIG. 7 in accordance with the present invention.

In FIG. 16, the computer system 58 is connected via its modem 70 to second computer system 58'. This connection can be by a network, the internet, or any other communication system for providing interchange of digital data. For sake of simplicity, the second computer system 58' is illustrated as being similar to the system 58 by including a CPU 60', ROM 61', RAM 62', input/output 63', bus 64', storage 65', display 68', keyboard 67', printer 68', bar code scanner 69' and modem 70'.

In operation of the computer system of FIG. 16, the procedure of FIG. 18 is employed wherein the steps 80 and 81 for receiving the bar code datum and generating the dual bar code image are performed in the computer system 58'. In step 95, this dual bar code image is transmitted to the computer system 58 and subsequently printed by step 96 performed by the computer system 58. An example of employment of this system would be the use of computer 58 to receive a purchase order document including the dual bar code from the computer 58', the sending by postal mail of a printed copy of the purchase order document to the location of the computer 58' along with a check or credit payment information, and the processing, including the scanning of the dual bar code on the copy of the purchase order document using the computer system 58'. In this example, the computer system 58' does not have information of the type of printer in the computer system 58, and in the absence of the dual bar code, the conventional bar code scanner 69' will often be unable to read bar codes on purchase orders printed at the customers location. The employment of the dual bar code greatly increases the probability that the bar code datum can be read by the bar code scanner 69'.

In a modified scanning procedure of FIG. 19, the upper bar code section of a dual bar code is scanned in step 101, the lower bar code section is scanned in step 102, and then the reading with the most correct white to black ratio of the two scans is selected in step 103. This selected scan is then converted into the bar code datum in step 104.

The dual bar code is described herein as being a horizontal arrangement of first and second vertical bar sections separated by respective first and second vertically extended spaces. However the terms "horizontal" "vertical" are used for simplicity in defining the transverse relationship of the arrangement of bars to the longitudinal dimension of the bars. It is intended that the terms "horizontal" and "vertical" encompass arrangements of pluralities bars in other orientations wherein the bars are transverse to the orientation. For example the dual bar code could very well be a vertical arrangement of first and second horizontal bar sections.

Since many modifications, variations and changes in detail can be made to the embodiments described above and illustrated in the drawings, it is intended that above description and the accompanying drawings be interpreted as only illustrative of one or a few of the many possible methods, apparatus and articles of manufacture that can be constructed in accordance with the present invention.

What is claimed is:

1. A method of forming a machine readable bar code from a bar code datum comprising:

generating a first bar code image section encoding the bar code datum by a horizontal arrangement of first vertical bar sections separated by first vertical space sections wherein the first vertical bar sections have first widths selected to produce a first printed bar code section of correct ratios of space width to bar width for a first type of printer;

generating a second bar code image section encoding the bar code datum by a horizontal arrangement of second vertical bar sections separated by second vertical space sections wherein the second vertical bar sections have second widths larger than said first widths and selected to produce a second printed bar code image section of correct ratio of space width to bar width for a second type of printer; and printing the first and the second bar code image sections in vertically displaced positions on a remote printer without need for programs to identify the type of the remote printer to enable printing of a correct bar code.

2. A method as claimed in claim 1 further comprising transmitting the first and second bar code image sections as a bit image prior to printing.

3. A method as claimed in claim 2 wherein the transmitting occurs between first and second computer systems.

4. An apparatus for producing a bar code image of a bar code datum for printing by first and second types of printers, the apparatus comprising:

a central processing unit; and a memory unit containing a program for controlling the central processing unit to produce the bar code image;

said program including means for generating a first bar code image section encoding the bar code datum by a horizontal arrangement of first vertical bar sections separated by first vertical space sections wherein the first vertical bar sections have first widths selected to produce a first printed bar code section of correct ratios of space width to bar width for the first type of printer, and means for generating a second bar code image section vertically displaced from said first bar code image section and encoding the bar code datum by a horizontal arrangement of second vertical bar sections separated by second vertical space sections wherein the second vertical bar sections have second widths larger than said first widths and selected to produce a second printed bar code image section of correct ratio of space width to bar width for a second type of printer; and means for enabling the printing of the first and the second bar code image sections in vertically displaced positions on a remote printer without need for programs to identify the type of the remote printer to enable printing of a correct bar code.

5. An apparatus as claimed in claim 4 further comprising means for transmitting the first and second bar code image sections as a bit image to a remote computer system.

6. An article of manufacture including a machine readable storage medium including a program for controlling a central processing unit to produce a bar code image;

said program including means for generating a first bar code image section encoding a bar code datum by a horizontal arrangement of first vertical bar sections separated by first vertical space sections wherein the first vertical bar sections have first widths selected to produce a first printed bar code section of correct ratios of space width to bar width for the first type of printer, and means for generating a second bar code image section vertically displaced from said first bar code image section and encoding the bar code datum by a horizontal arrangement of second vertical bar sections separated by second vertical space sections wherein the second vertical bar sections have second widths larger than said first widths and selected to produce a second printed bar code image section of correct ratio of space width to bar width for a second type of printer; and means for enabling the printing of the first and the second bar code image sections in vertically displaced positions on a remote printer without need for programs to identify the type of the remote printer to enable printing of a correct bar code.

* * * * *